(12) United States Patent
Fleddermann et al.

(10) Patent No.: US 12,208,882 B2
(45) Date of Patent: Jan. 28, 2025

(54) POWER CONTROL UNIT, HYDRAULIC SYSTEM AND AIRCRAFT USING THE SAME

(71) Applicants: Airbus Operations GmbH, Hamburg (DE); Airbus SAS, Blagnac (FR); Airbus Operations Limited, Filton Bristol (GB)

(72) Inventors: Andreas Fleddermann, Hamburg (DE); Xavier Lamoussiere, Blagnac (FR); Arnaud Didey, Filton Bristol (GB)

(73) Assignees: AIRBUS OPERATIONS GMBH, Hamburg (DE); AIRBUS SAS, Blagnac (FR); AIRBUS OPERATIONS LIMITED, Filton Bristol (GB)

( * ) Notice: Subject to any disclaimer, the term of this patent is extended or adjusted under 35 U.S.C. 154(b) by 0 days.

(21) Appl. No.: 17/701,306

(22) Filed: Mar. 22, 2022

(65) Prior Publication Data
US 2022/0306285 A1 Sep. 29, 2022

(30) Foreign Application Priority Data
Mar. 24, 2021 (DE) .................... 10 2021 107 418.5

(51) Int. Cl.
 *B64C 13/50* (2006.01)
(52) U.S. Cl.
 CPC .................................... *B64C 13/50* (2013.01)
(58) Field of Classification Search
 CPC ......... B64C 13/40; B64C 13/42; B64C 13/50; B64C 13/505
 See application file for complete search history.

(56) References Cited

U.S. PATENT DOCUMENTS

| 4,605,358 | A | * | 8/1986 | Burandt | F16H 47/02 417/236 |
| 4,892,274 | A | | 1/1990 | Pohl et al. | |
| 9,334,044 | B2 | | 5/2016 | Fleddermann et al. | |
| 2012/0187892 | A1 | * | 7/2012 | Tsunematsu | H02P 27/08 318/721 |

(Continued)

FOREIGN PATENT DOCUMENTS

| DE | 102004058984 A1 * | 6/2006 | ............... B60K 1/00 |
| EP | 0838396 A1 | 4/1998 | |

(Continued)

OTHER PUBLICATIONS

How It Works: Spring Engaged Friction Clutch-Mach III (Year: 2024).*

(Continued)

*Primary Examiner* — Richard Green
*Assistant Examiner* — Nevena Aleksic
(74) *Attorney, Agent, or Firm* — Greer, Burns & Crain, Ltd.

(57) ABSTRACT

A power control unit configured to supply hydraulic pressure and mechanical torque. To this end, the power control unit includes an electric motor coupled to a differential output transmission and a hydraulic pump. A switchable transmission device allows the torque of the motor to be redirected either to the output transmission, e.g., to drive high-lift devices, or to the hydraulic pump, e.g., to extend or retract landing gears.

6 Claims, 3 Drawing Sheets

(56) References Cited

U.S. PATENT DOCUMENTS

2014/0027568 A1\* 1/2014 Fleddermann .......... B64C 13/40
244/58

FOREIGN PATENT DOCUMENTS

| EP | 2690007 A1 | 1/2014 |
| EP | 2727831 A1 | 5/2014 |
| EP | 3257746 A1 | 12/2017 |

OTHER PUBLICATIONS

European Search Report for corresponding European Patent Application No. 22164000.6 dated Jul. 27, 2022.
German Search Report; priority document.

\* cited by examiner

US 12,208,882 B2

POWER CONTROL UNIT, HYDRAULIC SYSTEM AND AIRCRAFT USING THE SAME

CROSS-REFERENCES TO RELATED APPLICATIONS

This application claims the benefit of the German patent application No. 102021107418.5 filed on Mar. 24, 2021, the entire disclosures of which are incorporated herein by way of reference.

FIELD OF THE INVENTION

The invention relates to a power control unit (PCU) and systems using this PCU. Furthermore, the invention relates to an aircraft using these systems and PCU.

BACKGROUND OF THE INVENTION

Typically, the high lift systems of commercial and military aircraft are powered by a centralized PCU mounted in the fuselage with computerized control. Commonly the PCU is connected to a torque shaft system which provides the mechanical power to the geared actuators at the flap or slat panel drive stations. Additionally, a wing tip brake (WTB) in each wing is an integrated part of the transmission system. The WTB is configured to arrest and hold the system in failure cases. Two independent slat flap computers (SFCC) control and monitor the system.

Common PCUs have two independent motors which are connected by a speed summing differential gear (DIFG). Each motor is provided with a power-off brake (POB) to arrest the motor in the commanded position. Depending on the aircraft power supply system and the availability requirements, the PCU can be purely hydraulically or electrically driven or includes each of an electric motor and a hydraulic motor (hybrid PCU).

For the electric drive, digitally controlled brushless DC motors are commonly used. Motor control is usually established by a closed loop layout to maintain speed and torque command inputs. The control algorithms can be implemented in a controller (e.g., SFCC) which is provided with all required data to control the motors.

The electric motor is supplied by the aircraft electrical busbar. A motor control electronic (MCE) is interfacing with the SFCC and the aircraft electrical busbar. The MCE converts the electric power as required for the brushless DC motor and provides motor control. It is also possible that the control algorithm is implemented in the MCE. In this case the SFCC provides corresponding drive states (e.g., via a data bus system).

In the default high-lift operating mode the WTBs are released and the PCU is providing the power to operate the high-lift system (HLS) with the commanded speed into any gated position.

As a result, the PCU is usually only operating for a very small time frame (starting and landing) of a flight.

SUMMARY OF THE INVENTION

It is an object of the invention to improve PCUs and related devices with respect to their versatility, and, in particular, to allow for further uses.

The invention provides a power control unit (PCU) configured to supply hydraulic pressure and mechanical torque, the power control unit comprising an electric motor that is configured to generate torque; and a differential output transmission that is operatively coupled to the motor so as to be driven by the motor and configured to supply the torque to a torque consumer, wherein the power control unit further comprises a hydraulic pump that is operatively coupled to the motor so as to be driven by the motor.

Preferably, the PCU further comprises a transmission device that is operatively arranged to transmit the torque from the motor to the output transmission and the hydraulic pump, wherein the transmission device is switchable between a disabled state, in which torque transmission from the motor to the hydraulic pump is prevented, and an enabled state, in which torque transmission from the motor to the hydraulic pump is allowed.

Preferably, the transmission device comprises a torque switching device that is operatively arranged between the motor and the output transmission and that is, upon receiving power, switchable between a first state, in which torque transmission from the motor to the output transmission is prevented, and a second state, in which torque transmission from the motor to the output transmission is allowed, wherein, in the absence of power, the torque switching device switches into the first state.

Preferably, the torque switching device includes a power-off brake device that is operatively arranged between the motor and the output transmission and that has, as the first state, a brake engaged state in which torque transmission from the motor to the output transmission is blocked, and that has, as the second state, a brake disengaged state in which torque transmission from the motor to the output transmission is allowed.

Preferably, the torque switching device includes a normally-open clutch device that is operatively arranged between the motor and the output transmission and that has, as the first state, a clutch disengaged state in which torque transmission from the motor to the output transmission is interrupted, and that has, as the second state, a clutch engaged state in which torque transmission from the motor to the output transmission is allowed.

Preferably, the transmission device comprises a transmission member including a torque input and a torque output, wherein the torque input is operatively coupled to the motor and the torque output is operatively coupled to the output transmission.

Preferably, the torque switching device is operatively arranged between the torque output and the output transmission.

Preferably, the power-off brake device is operatively arranged between the torque output and the output transmission.

Preferably, the normally-open clutch device is operatively arranged between the torque output and the output transmission.

Preferably, the transmission member includes a gear assembly having a plurality of gears. Preferably the gears are spur gears. Preferably, the gear assembly is configured as an epicyclic gear box. Preferably, the gear assembly comprises a pair of spur gears.

Preferably, the transmission member has a second torque output that is operatively coupled to the hydraulic pump.

Preferably, the transmission device includes an additional torque switching device that is operatively coupled to the second torque output and that is, upon receiving power, switchable between a first state, in which torque transmission to the second torque output is prevented, and a second state, in which torque transmission to the second torque output is allowed, wherein, in the absence of power, the additional torque switching device switches into the first state.

Preferably, the additional torque switching device includes an additional power-off brake device that is operatively coupled to the second torque output and that has, as the first state, a brake engaged state in which torque transmission to the second torque output is blocked, and that has, as the second state, a brake disengaged state in which torque transmission to the second torque output is allowed.

Preferably, the additional torque switching device includes a normally-open clutch device that is operatively coupled to the second torque output and that has, as the first state, a clutch disengaged state in which torque transmission to the second torque output is interrupted, and that has, as the second state, a clutch engaged state in which torque transmission to the second torque output is allowed.

Preferably, the PCU further comprises a locking device that is operatively coupled to the output transmission so as to be able to arrest the output of the output transmission.

The invention provides a hydraulic system, preferably for an aircraft, the system comprising a reservoir configured for hydraulic fluid, a hydraulic circuit configured for supplying a hydraulic consumer and leading the hydraulic fluid back to the reservoir, and a PCU according to any of the preceding claims, wherein the hydraulic pump is arranged in the hydraulic circuit, so as to allow pressurization of the hydraulic fluid.

The invention provides a drive system configured for driving an aircraft component, for example a high-lift device, a control surface, a landing gear, a landing gear brake, and a cargo door, the drive system comprising a preferred hydraulic system, wherein the hydraulic consumer is a hydraulic actuator that is configured to drive the aircraft component.

Preferably, the drive system further comprises a locking device that is operatively coupled to the output transmission so as to be able to arrest the output of the output transmission.

Preferably, the locking device comprises a wing tip brake for arresting the output of the output transmission.

The invention provides an aircraft, preferably an airplane, comprising a preferred PCU, a preferred hydraulic system, and/or a preferred drive system, wherein the drive system is operatively coupled to the aircraft component, so as to drive the aircraft component.

The invention provides a method for operating a PCU so as to supply hydraulic pressure and mechanical torque, the method comprising:

a) generating torque with a motor;
b) selectively transmitting, with a transmission device, the torque from the motor to a differential output transmission, so as to provide mechanical torque to consumers, or transmitting, with the transmission device, the torque from the motor to a hydraulic pump, so that the hydraulic pump generates hydraulic pressure.

Preferably step b) includes that, with a torque switching device, the torque is allowed to being transmitted to the output transmission.

Preferably step b) includes that, with a torque switching device the torque is prevented from being transmitted from the motor to the output transmission, while with an additional torque switching device, the torque is allowed to be transmitted from the motor to the hydraulic pump.

Preferably step b) includes that, with a torque switching device, the torque is allowed to be transmitted from the motor to the output transmission, while with an additional torque switching device, the torque is prevented from being transmitted from the motor to the hydraulic pump.

The aircraft hydraulic system is pressurized by engine driven pumps (EDP) and usually equipped with electric motor pumps (EMP) to provide the hydraulic power in case the EDPs are not active (e.g., ground case, failure case) or to increase the performance of the hydraulic system in case of high flow demand. On existing aircraft, typically a mixture of EDP and EMP is linked to the hydraulic systems.

One idea is to use the electric PCU of the high-lift system also as an electric motor pump (EMP) within the aircraft hydraulic supply system to provide hydraulic energy for different consumers. Hence, the electric drives of the PCU are used for further functions in order to reduce the number of electric motors in the aircraft.

The electric PCU, equipped with brushless DC motors coupled via a differential gear, comprises all features required to drive a hydraulic pump of an aircraft hydraulic circuit.

There are various options to control the pump delivery characteristic. In case of a fixed displacement pump, the delivery rate can be controlled by adjusting the PCU electric motor speed or in case of a constant motor speed, by adjusting the pump displacement. Depending on the demand, the PCU can be equipped with one or two pumps.

To operate the electric PCU in an EMP mode some variants can be considered.

In one variant, the hydraulic pump can be always active, even when the PCU is operating in high-lift mode. In high-lift mode the POBs are released and the electric motor drives the input of the differential gear and the pump shaft via a simple spur gear (SG) or an electric motor with two output shafts.

When the HLS is not operated, the system is arrested normally in the gated position by engagement of the POBs. Therefore, in case hydraulic power is required, the POBs are released. In case the WTBs are engaged and one POB is also engaged, the differential output transmission is locked. To avoid unintended movement of the HLS in the pure EMP mode the output shaft of the PCU needs to be arrested (e.g., engagement of WTBs). In this configuration the high lift system is safely fixed by the WTBs. After operation of the PCU as an electric motor pump, the reaction torque in the transmission is relieved by a corresponding sequence already implemented for the high-lift application. If necessary (e.g., performance capability of the PCU electric motor) the pump delivery in the high-lift mode can be reduced or disabled by controlling the displacement of the pump accordingly. An additional option would be to disable by a unidirectional ratchet mechanism which disengages the pump during Flap extension.

In another variant, the hydraulic pump is active on demand when the PCU is not operating in high-lift mode. An additional planetary differential gear stage (PDG) between electric motor and POB with an additional power-off brake (APOB) or clutch allows to select between high-lift mode and pump mode. In high-lift mode the POBs are released and the shaft of the pump is arrested via the brake at the additional pump gear stage. In pump mode the POBs are engaged to arrest the high-lift system in the gated position. The electric motor can drive the pump shaft when the brake (APOB) at the pump gear stage is released.

With the ideas disclosed herein, a digitally speed controlled electric PCU of the high-lift system can be used to pressurize the hydraulic system in flight or on ground alternatively to EMPs of the hydraulic system. This provides a further means to increase the capacity of the hydraulic supply system in cases of high flow demand during flight without having additional hydraulic pumps in the aircraft hydraulic supply system.

Electric motor pumps within the hydraulic system used only on ground to pressurize the system for maintenance purpose or ground handling could be completely removed from the hydraulic system by this invention.

Another idea of the invention is to mutualize components and resources at aircraft level that are already present by enabling that the electric motors and motor controllers used to drive flaps and slats may be additionally used for other purposes and by other aircraft systems. For example, the components are used to drive hydraulic pumps that may be used by other consumers such as a cargo door or a landing gear and the corresponding brakes.

BRIEF DESCRIPTION OF THE DRAWINGS

Embodiments are described in more detail with reference to the accompanying drawings.

DETAILED DESCRIPTION OF THE PREFERRED EMBODIMENTS

Figure 1:
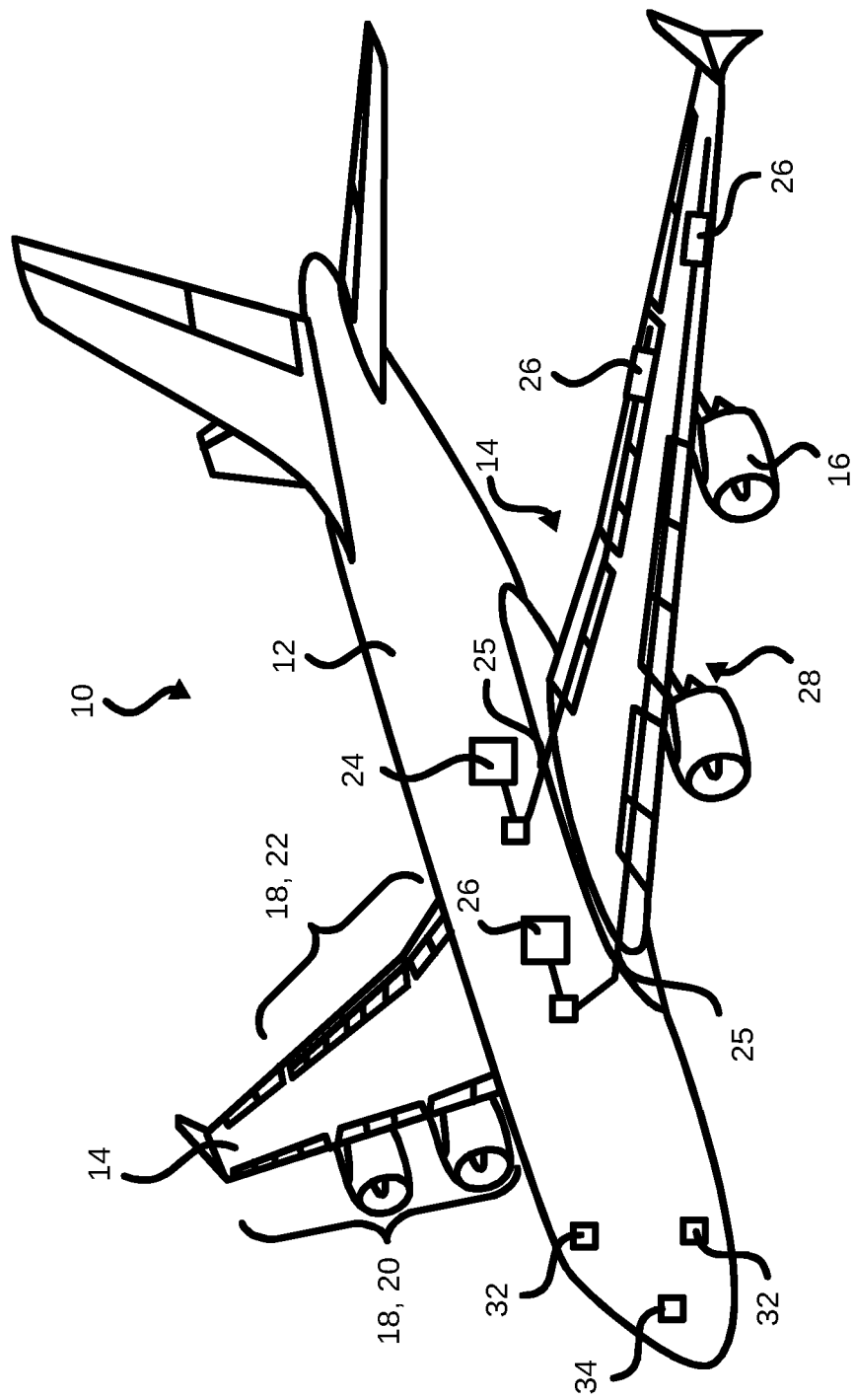
FIG. 1 depicts an embodiment of an aircraft.

Referring to FIG. 1, an aircraft 10 has a fuselage 12. The aircraft 10 also has a pair of wings 14 that are attached to the fuselage 12. The aircraft 10 further comprises engines 16 that are attached to the wings 14.

The aircraft 10 has a plurality of high-lift devices 18, such as slats 20 and flaps 22. The high-lift devices 18 are driven by a power control unit or PCU 24. The PCU 24 outputs torque to drive shafts 25 that are connected to the high-lift devices 18 in a manner known per se. In order to arrest the high-lift devices 18 in a predetermined position, wing tip brakes 26 are arranged near the end portions of the drive shafts 25.

The PCU 24 is part of a drive system 28 configured to drive the high-lift devices 18 and a hydraulic system 30 configured to drive other aircraft components, such as landing gears or cargo doors. The PCU 24 is controlled by a corresponding control device 32 that controls the PCU 24 in correspondence with the pilot's operation of an input device 34.

Figure 2:
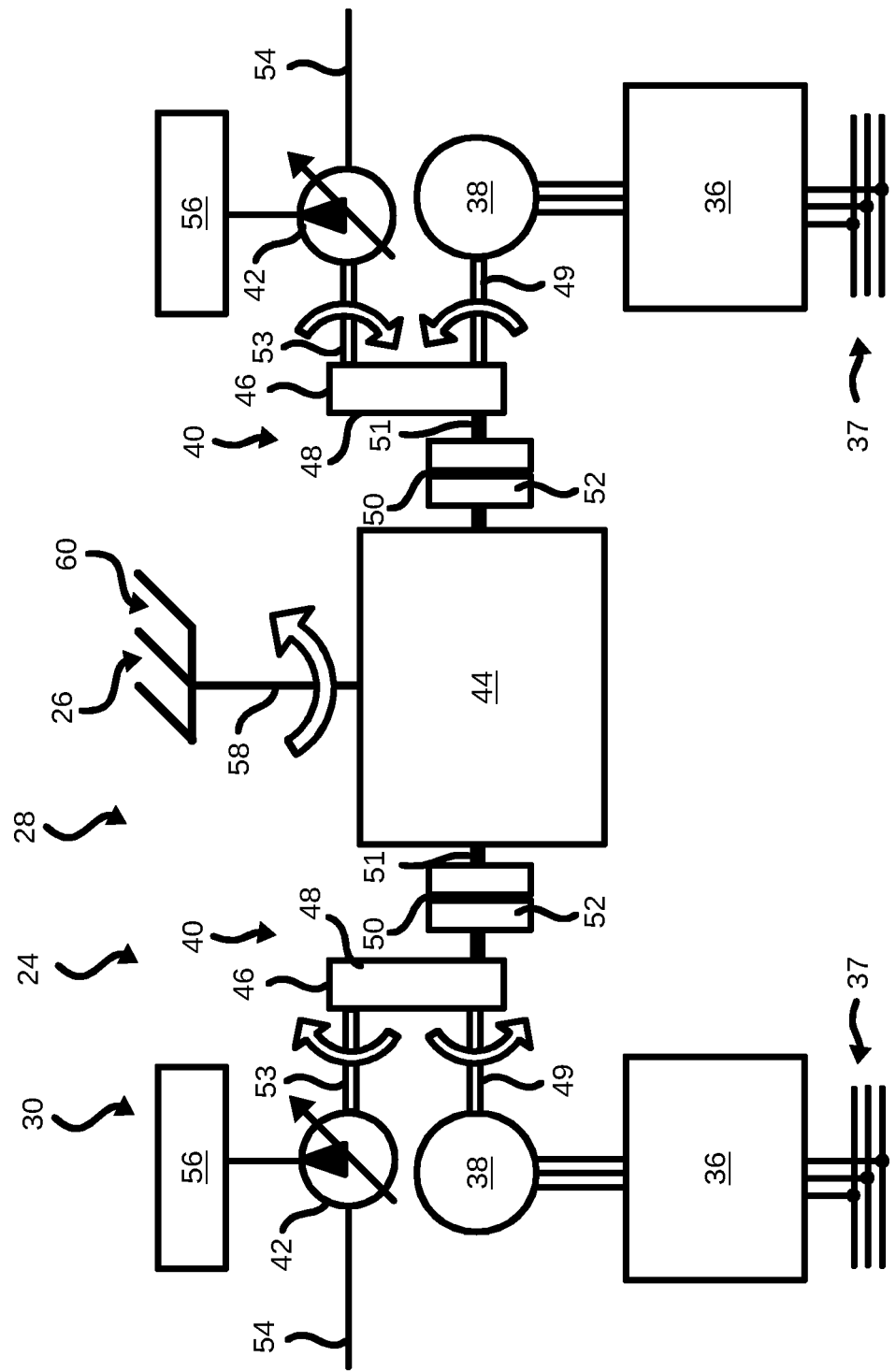
FIG. 2 depicts an embodiment of a PCU installed in the aircraft of FIG. 1.

Referring to FIG. 2, the PCU 24 comprises a motor control electronic or MCE 36, an electric motor 38, a transmission device 40, a hydraulic pump 42 and a differential output transmission 44. As depicted, these parts can be doubled up, so as to provide redundancy. It is also possible that instead of doubling up, a different arrangement of parts is used. Furthermore, it is also possible that only a single arrangement of these parts is present.

The MCE 36 is connected to an aircraft electric system 37 in a manner known per se. The MCE 36 is configured to control the electric motor 38 and electrically connected to the electric motor 38.

The output shaft of the electric motor 38 is mechanically coupled to the transmission device 40.

The transmission device 40 is mechanically coupled to the hydraulic pump 42 and the output transmission 44.

In a variant it is also possible that the electric motor 38 is directly coupled to the transmission device 40 and the hydraulic pump 42 using two output shafts of the electric motor 38.

The transmission device 40 includes a transmission member 46. The transmission member 46 can be configured as a gear assembly 48 that has a plurality of gears. The gear assembly 48 may comprise two spur gears, for example. The electric motor 38 is coupled to the transmission member 46 via a torque input 49. The transmission member 46 is coupled to the output transmission 44 via a torque output 51 and to the hydraulic pump 42 via a second torque output 53.

The transmission device 40 includes a torque switching device 50. The torque switching device 50 is arranged so as to enable preventing and allowing of torque transmission between the transmission member 46 and the output transmission 44. The torque switching device 50 has a power-off brake 52 for preventing and allowing torque transmission. It should be noted that it is also possible to use a normal-open clutch instead.

The hydraulic pump 42 is integrated into a hydraulic circuit 54. The hydraulic circuit 54 provides hydraulic consumers 56 with the required hydraulic pressure. The hydraulic pump 42 converts torque that it receives into hydraulic pressure.

The output transmission 44 comprises an output shaft 58. The output transmission 44 can be coupled to torque consumers, such as the high-lift devices 18.

Subsequently, the operation of the PCU 24 is described.

The PCU 24 operates in two modes: a high-lift mode and a hydraulic mode. In the high-lift mode, the electric motor 38 drives via the transmission device 40 the hydraulic pump 42 and the output transmission 44. The output transmission 44 transmits the torque via its output shaft 58 to the high-lift devices 18 thereby driving them into the desired position. The high-lift devices 18 of the high-lift system can be held in the gated position by the torque switching device 50 of the PCU 24. The WTB 26 can be used to arrest the high-lift devices 18 in failure cases (e.g., transmission disconnect etc.).

As the case may be, the PCU 24 can be switched into the hydraulic mode, e.g., if there is a high flow demand for extending the landing gear. In the hydraulic mode, movement of the output shaft 58 is arrested via the wing tip brakes 26 acting as locking devices 60. It should be noted that this can also be achieved via a separate locking device 60 suitably arranged at the output transmission 44.

In both modes, the torque switching device 50 is in a state which allows torque transmission from the electric motor 38 to the hydraulic pump 42 and the output transmission 44. Due to the output transmission 44 being a differential transmission, the torque is redirected towards the hydraulic pump 42.

The torsional tension present in the drive train from the output transmission 44 to the high-lift devices is known and can be released by known methods.

If neither hydraulic nor mechanical output is needed from the PCU 24, the electric motor 38 is switched of and the system is arrested by the torque switching device 50, e.g., by engaging the power-off brakes 52.

Figure 3:
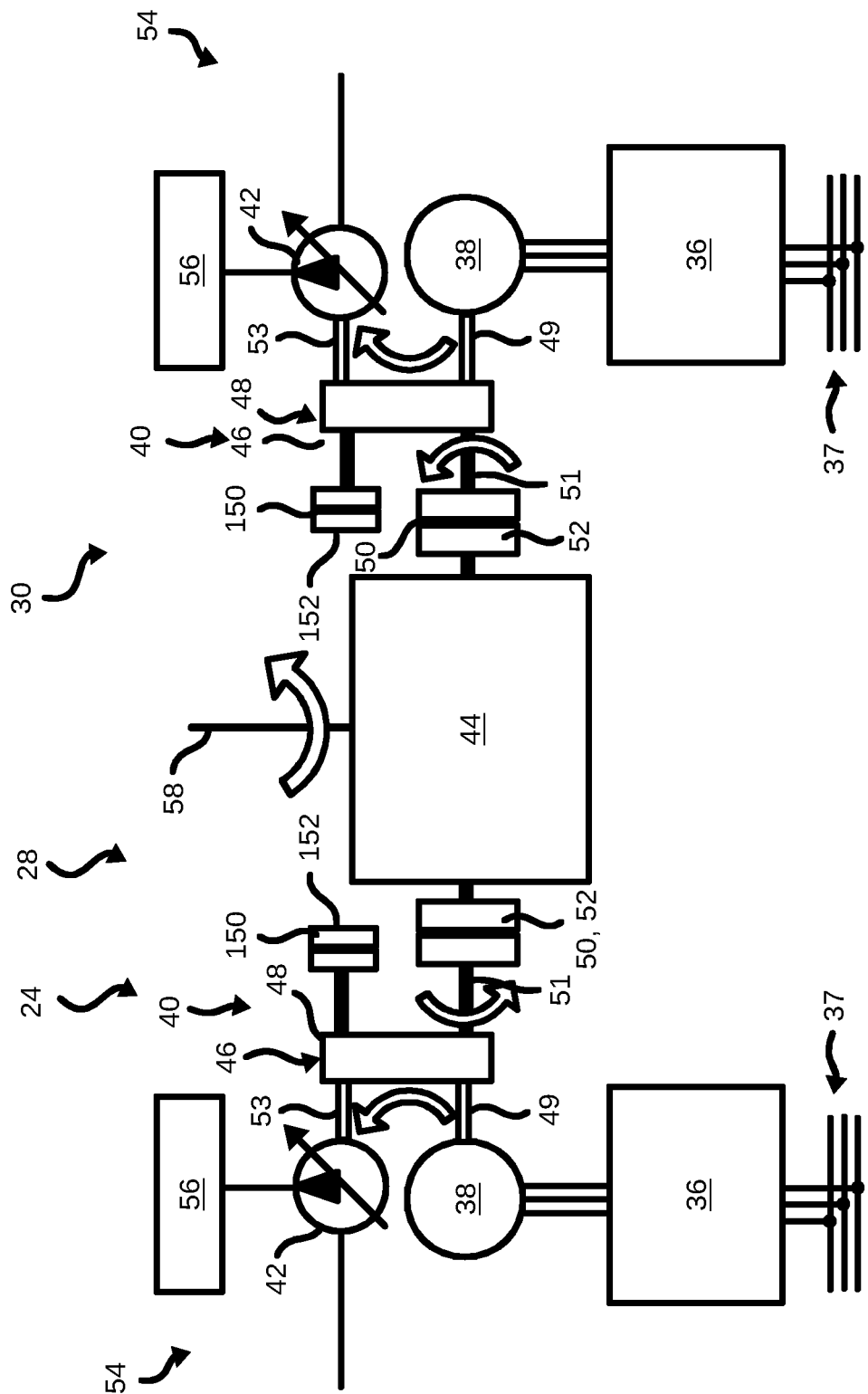
FIG. 3 depicts another embodiment of a PCU.

Referring to FIG. 3, another embodiment of the PCU 24 is described only insofar as it differs from the previous embodiment. In this embodiment, the gear assembly 48 is configured as an epicyclic gear box.

The transmission device 40 includes an additional torque switching device 150. The additional torque switching device 150 is arranged so as to enable preventing and allowing of torque transmission to the hydraulic pump 42. The torque switching device 150 has an additional power-off brake 152 for preventing and allowing torque transmission. It should be noted that it is also possible to use a normal-open clutch instead.

Subsequently, the operation of the PCU 24 is described.

The PCU 24 operates in two modes: a high-lift mode and a hydraulic mode. In the high-lift mode, the electric motor 38 drives via the transmission device 40 the output transmission 44. The torque switching device 50 is disengaged and allows torque transmission from the electric motor 38 to the output transmission 44. The additional torque switching device 150 is engaged and prevents torque transmission from the electric motor 38 to the hydraulic pump 42. As a result, the output transmission 44 transmits the torque via its output shaft 58 to the high-lift devices 18, thereby driving them into the desired position.

As the case may be, the PCU 24 can be switched into the hydraulic mode, e.g., if there is a high flow demand for extending the landing gear. In the hydraulic mode, the torque switching device 50 is engaged, thereby preventing torque transmission from the electric motor 38 to the output transmission 44. The additional torque switching device 152 is disengaged so as to allow torque transmission from the electric motor 38 to the hydraulic pump 42. As a result, the hydraulic pump 42 is able to pressurize the hydraulic fluid.

The torque switching device 50 and the additional torque switching device 150 are in opposite states for both modes, thereby redirecting the torque of the electric motor 38 either to the hydraulic pump 42 (hydraulic mode) or to the output transmission 44 (high-lift mode).

With this embodiment torsional tension in the drive train from the output transmission 44 to the high-lift devices 18 can be avoided.

If neither hydraulic nor mechanical output is needed from the PCU 24, the electric motor 38 is switched of and the system can be arrested by the torque switching devices 50, 150, e.g., by engaging the respective power-off brakes 52, 152.

In order to improve the versatility of PCUs (24), the invention proposes a power control unit (24) that can supply hydraulic pressure and mechanical torque. To this end, the power control unit (24) comprises an electric motor (38) that is coupled to a differential output transmission (44) and a hydraulic pump (42). A switchable transmission device (40) allows the torque of the motor (38) to be redirected either to the output transmission (44), e.g., for driving high-lift devices, or to the hydraulic pump (42), e.g., for extending or retracting landing gears.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS 10 aircraft
12 fuselage
14 wing
16 engine
18 high-lift device
20 slat
22 flap
24 hydraulic power control (PCU)
25 drive shaft
26 wing tip brakes (WTB)
28 drive system
30 hydraulic system
32 control device
34 input device
36 motor control electronic (MCE)
37 aircraft electric system
38 electric motor
40 transmission device
42 hydraulic pump
44 differential output transmission
46 transmission member
48 gear assembly
49 torque input
50 torque switching device
51 torque output
52 power-off brake (POB)
53 second torque output
54 hydraulic circuit
56 hydraulic consumer
58 output shaft
60 locking device
150 additional torque switching device
152 additional power-off brake (APOB)

The invention claimed is:

1. A power control unit configured to supply hydraulic pressure and mechanical torque, the power control unit comprising
    an electric motor configured to generate torque;
    a differential output transmission operatively coupled to the motor to be driven by the motor and configured to supply the torque to a torque consumer;
    a hydraulic pump operatively coupled to the motor to be driven by the motor; and
    a transmission device coupled to the motor and transmitting a first torque output to the differential output transmission and a second torque output to the hydraulic pump,
    wherein the transmission device comprises a first torque switching device operatively arranged between the motor and the differential output transmission and that is, upon receiving power, switchable between a first state, in which the first torque output from the motor to the differential output transmission is prevented, and a second state, in which the first torque output from the motor to the differential output transmission is allowed,
    wherein the transmission device includes a second torque switching device operatively coupled to the second torque output and that is, upon receiving power, switchable between a first state, in which torque transmission to the hydraulic pump is prevented, and a second state, in which torque transmission to the hydraulic pump is allowed,
    wherein, in an absence of power, the first torque switching device switches into the first state,
    wherein, in an absence of power, the second torque switching device switches into the first state.

2. The power control unit according to claim 1, wherein the first torque switching device comprises at least one of:

a power-off brake device operatively arranged between the motor and the differential output transmission and that has, as the first state, a brake engaged state in which the first torque output from the motor to the differential output transmission is blocked, and that has, as the second state, a brake disengaged state in which the first torque output from the motor to the differential output transmission is allowed; or a normally-open clutch device operatively arranged between the motor and the differential output transmission and that has, as the first state, a clutch disengaged state in which the first torque output from the motor to the differential output transmission is interrupted, and that has, as the second state, a clutch engaged state in which the first torque output from the motor to the differential output transmission is allowed.

3. The power control unit according to claim 2, wherein the transmission device comprises a transmission member including a torque input and a torque output, wherein the torque input is operatively coupled to the motor and the torque output is operatively coupled to the differential output transmission.

4. The power control unit according to claim 3, wherein the first torque switching device is operatively arranged between the first torque output and the differential output transmission.

5. The power control unit according to claim 3,
wherein the transmission member includes a gear assembly having a plurality of gears,
wherein the gear assembly is configured as an epicyclic gear box or comprises a pair of spur gears.

6. The power control unit according to claim 1, wherein the second torque switching device includes at least one of:
an additional power-off brake device operatively coupled to the second torque output and that has, as the first state, a brake engaged state in which torque transmission to the second torque output is blocked, and that has, as the second state, a brake disengaged state in which torque transmission to the second torque output is allowed; or
a normally-open clutch device operatively coupled to the second torque output and that has, as the first state, a clutch disengaged state in which torque transmission to the second torque output is interrupted, and that has, as the second state, a clutch engaged state in which torque transmission to the second torque output is allowed.

* * * * *